(12) United States Patent
Sakaguchi

(10) Patent No.: US 9,046,598 B2
(45) Date of Patent: Jun. 2, 2015

(54) SIGNAL PROCESSING DEVICE, SIGNAL PROCESSING METHOD, RECORDING MEDIUM, AND PROGRAM

(71) Applicant: Sony Corporation, Tokyo (JP)

(72) Inventor: Tatsumi Sakaguchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/343,076

(22) PCT Filed: Sep. 21, 2012

(86) PCT No.: PCT/JP2012/074146
§ 371 (c)(1),
(2) Date: Mar. 6, 2014

(87) PCT Pub. No.: WO2013/047337
PCT Pub. Date: Apr. 4, 2013

(65) Prior Publication Data
US 2014/0219061 A1 Aug. 7, 2014
US 2015/0049586 A2 Feb. 19, 2015

(30) Foreign Application Priority Data
Sep. 30, 2011 (JP) ................. 2011-217369

(51) Int. Cl.
*G01S 15/00* (2006.01)
*G01S 7/52* (2006.01)
(Continued)

(52) U.S. Cl.
CPC ................ *G01S 7/52* (2013.01); *G01S 7/5205* (2013.01); *G01S 15/8915* (2013.01); *G01S 15/8929* (2013.01); *G01S 15/02* (2013.01)

(58) Field of Classification Search
CPC ......... G01S 7/52; G01S 7/5205; G01S 15/02; G01S 15/8929; G01S 15/8915
USPC ................................. 367/123, 125
See application file for complete search history.

(56) References Cited

U.S. PATENT DOCUMENTS 4,989,143 A * 1/1991 O'Donnell et al. ........... 600/437
5,581,620 A * 12/1996 Brandstein et al. ............. 381/92
(Continued)

FOREIGN PATENT DOCUMENTS

JP 05-031107 2/1993
JP 2002-541899 12/2002
JP 2005-137581 6/2005

OTHER PUBLICATIONS

Casula et al., Control of complex components with Smart Flexible Phased Arrays. Ultrasonics. Dec. 22, 2006;44 Suppl 1:e647-51. Epub Jun. 6, 2006.

(Continued)

*Primary Examiner* — Isam Alsomiri
*Assistant Examiner* — Hovhannes Baghdasaryan
(74) *Attorney, Agent, or Firm* — Wolf, Greenfield & Sacks, P.C.

(57) ABSTRACT

This technology relates to a signal processing device, a signal processing method, a recording medium, and a program capable of enabling appropriate beam forming with a simple configuration even when a positional relationship between a plurality of transducers included in a probe of an ultrasonic diagnostic device is not fixed.

A reception BF unit calculates a phase difference indicating a relative positional shift between a plurality of transducers based on a difference between each phase difference of a signal of a reflective wave in each of a plurality of transducers of an ultrasonic wave transmitted from a transducer being a transmission target out of a plurality of transducers, relative positions of which are not fixed, and each known phase difference of the signal of the reflective wave in a plurality of transducers in a case in which an arrangement of a plurality of transducers is a reference arrangement. A delay calculating unit calculates a delay amount of each of a plurality of transducers used in the beam forming based on the phase difference calculated by a phase difference calculating unit. This technology may be applied to an ultrasonic diagnostic device.

10 Claims, 11 Drawing Sheets

(51) Int. Cl.
*G01S 15/89* (2006.01)
*G01S 15/02* (2006.01)

(56) References Cited

U.S. PATENT DOCUMENTS

| | | | |
|---|---|---|---|
| 5,617,862 A * | 4/1997 | Cole et al. | 600/459 |
| 6,029,116 A * | 2/2000 | Wright et al. | 702/32 |
| 6,652,461 B1 | 11/2003 | Levkovitz | |
| 2002/0123686 A1 * | 9/2002 | Miwa et al. | 600/437 |
| 2005/0096542 A1 * | 5/2005 | Weng et al. | 600/439 |
| 2008/0086056 A1 * | 4/2008 | Chang et al. | 600/459 |
| 2010/0145188 A1 * | 6/2010 | Miyaoka | 600/425 |
| 2010/0158267 A1 * | 6/2010 | Thormundsson et al. | 381/92 |

OTHER PUBLICATIONS

Ries et al., Phase aberration correction in two dimensions using a deformable array transducer, Proceedings of the 1995 Ultrasonics Symposium, 1995, vol. 2, pp. 1439-1442.

* cited by examiner

SIGNAL PROCESSING DEVICE, SIGNAL PROCESSING METHOD, RECORDING MEDIUM, AND PROGRAM

CROSS REFERENCE TO RELATED APPLICATIONS

The present application is a National Stage filing under 37 U.S.C. 371 of International Application No. PCT/JP2012/074146, filed Sep. 21, 2012, which claims priority under 35 U.S.C. §119 to Japanese Patent Application No. 2011-217369, filed in the Japan Patent Office on Sep. 30, 2011, the entire contents of each of which are incorporated herein by reference.

TECHNICAL FIELD

This technology relates to a signal processing device, a signal processing method, a recording medium, and a program, and especially relates to the signal processing device, the signal processing method, the recording medium, and the program capable of enabling appropriate beam forming with a simple configuration even when a positional relationship between a plurality of transducers included in a probe of an ultrasonic diagnostic device is not fixed.

BACKGROUND ART

Conventionally, the ultrasonic diagnostic device receives a reflective wave of an ultrasonic wave transmitted from a plurality of transducers included in the probe into a living body by the probe. Then, the ultrasonic diagnostic device images a target to be measured by processing the received reflective wave. At that time, the beam forming is performed in the ultrasonic diagnostic device. The beam forming is a process to individually control a timing at which each transducer transmits/receives the ultrasonic wave based on a delay amount of the ultrasonic wave.

There is a probe, an arrangement position of each transducer of which is fixed. In the ultrasonic diagnostic device including such probe, the delay amount of each transducer for performing the beam forming is calculated in advance based on the arrangement position of each transducer for each probe to be stored in a storage device in the ultrasonic diagnostic device as a fixed value. When the beam forming is performed, a corresponding delay amount is read from the storage device to be used for each probe.

In order to reduce a volume in the storage device which stores such delay amount, there is a method of calculating the delay amount each time the beam forming is performed based on the arrangement position of the transducer in the probe (for example, refer to Patent Document 1).

In contrast, there is a method in which a plurality of probes, the arrangement positions of which are not fixed, is connected and image data obtained by each probe are synthesized to be imaged (for example, refer to Patent Document 2). In this method, an angle sensor is provided on a connecting portion of the probes and a relative positional relationship between the transducers included in the probes is calculated based on an angle detected by the angle sensor.

CITATION LIST

Patent Document

Patent Document 1: JP 05-31107 A
Patent Document 2: JP 2005-137581 A

SUMMARY OF THE INVENTION

Problems to be Solved by the Invention

However, the method in Patent Document 1 may be applied only when the arrangement position of the transducer in the probe is known, and this is applied with difficulty when the arrangement position of the transducer is not clear, for example, when the positional relationship between the transducers is not fixed.

In the method in Patent Document 2, it is necessary to mount the angle sensor on each probe for calculating the relative positional relationship between the transducers included in the probes. Therefore, when the number of probes increases, the angle sensors of a corresponding number are required, so that the configuration is complicated.

This technology is achieved in view of such a condition and an object thereof is to enable the appropriate beam forming with the simple configuration even when the positional relationship between a plurality of transducers included in the probe of the ultrasonic diagnostic device is not fixed.

Solutions to Problems

A signal processing device according to one aspect of this technology is provided with a phase difference calculating unit which calculates a phase difference indicating a relative positional shift between a plurality of transducers based on a difference between each phase difference of a signal of a reflective wave in each of the plurality of transducers of an ultrasonic wave transmitted from a transducer being a transmission target out of the plurality of transducers, relative positions of which are not fixed, and each known phase difference of the signal of the reflective wave in each of the plurality of transducers when an arrangement of the plurality of transducers is supposed to be a reference arrangement; and a delay calculating unit which calculates a delay amount of each of the plurality of transducers used in beam forming based on the phase difference calculated by the phase difference calculating unit.

One of the plurality of transducers may be selected as the transmission target each time the phase difference calculating unit calculates the phase difference indicating the positional shift.

Two or more of the plurality of transducers may be selected as transmission targets each time the phase difference calculating unit calculates the phase difference indicating the positional shift.

The phase difference calculating unit may adopt an arrangement without the positional shift between the plurality of transducers as the reference arrangement.

The phase difference calculating unit may adopt an arrangement without the positional shift between the plurality of transducers as the reference arrangement in first calculation of the phase difference indicating the positional shift and adopt the arrangement of the plurality of transducers with the positional shift indicated by the previously calculated phase difference as the reference arrangement in second or subsequent calculation.

The plurality of transducers may be one-dimensionally arranged.

The plurality of transducers may be two-dimensionally arranged.

The plurality of transducers may be divided into a plurality of functional blocks such that a group of a predetermined number of transducers is made a functional block, and the phase difference calculating means may calculate the phase difference indicating the positional shift for each unit while making the functional block a unit.

A signal processing method, a recording medium, and a program according to one aspect of this technology is the signal processing method, the recording medium, and the program corresponding to the signal processing device according to one aspect of this technology described above.

In the signal processing device, the signal processing method, the recording medium, and the program according to one aspect of this technology, a phase difference indicating a relative positional shift between a plurality of transducers is calculated based on a difference between each phase difference of a signal of a reflective wave in each of the plurality of transducers of an ultrasonic wave transmitted from a transducer being a transmission target out of the plurality of transducers, relative positions of which are not fixed, and each known phase difference of the signal of the reflective wave in each of the plurality of transducers when an arrangement of the plurality of transducers is supposed to be a reference arrangement; and a delay amount of each of the plurality of transducers used in beam forming is calculated based on the calculated phase difference.

Effects of the Invention

As described above, according to this technology, it is possible to enable the appropriate beam forming with the simple configuration even when the positional relationship between a plurality of transducers included in the probe of the ultrasonic diagnostic device is not fixed.

MODE FOR CARRYING OUT THE INVENTION

Reception Beam Forming

Reception beam forming in an ultrasonic diagnostic device is first described in order to facilitate understanding of this technology.

Figure 1:
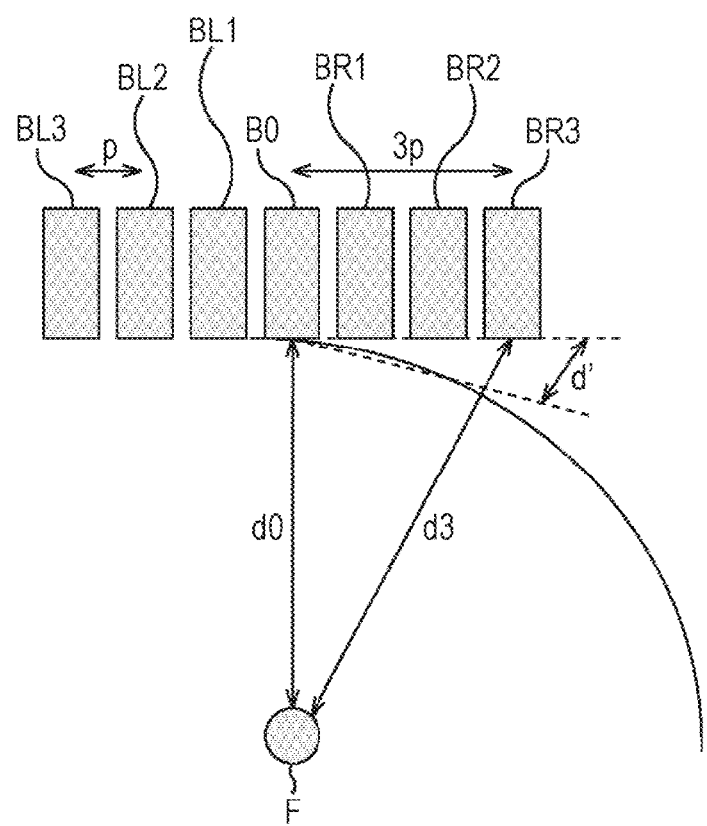
FIG. 1 is a view of a relationship between transducers and a target point.

FIG. 1 is a view of a relationship between transducers and a target point.

The reception beam forming is generation of a signal indicating intensity of a reflective wave from the target point in a measurement area (hereinafter, referred to as a reflective wave detection signal) by aligning phases of reception waves by a process to add each signal obtained by delaying each reception wave of each transducer based on a distance from the target point in the measurement area to each transducer in a probe (hereinafter, appropriately referred to as a phasing adding process).

As illustrated in FIG. 1, an ultrasonic wave is transmitted from each of transducers BL3, BL2, BL1, B0, BR1, BR2, and BR3 one-dimensionally arranged in an array pattern to form an ultrasonic beam. The ultrasonic beam strikes a target point F to be reflected. The reflective wave from the target point F may be considered as reflection from a point sound source, so that this is concentrically propagated in a transmitting direction. A time at which the reflective wave from the target point F arrives at each transducer slightly differs depending on a position of each transducer. This slight difference is generated due to a difference in distance from the target point F to each transducer because the transducers are linearly arranged while the reflective wave is concentrically emitted from the target point F.

For example, the reflective wave from the target point F should travel a distance d3 in order to arrive at the transducer BR3 while this travels a distance d0 to arrive at the transducer B0. As illustrated in FIG. 1, a distance between the transducer B0 and the transducer BR3 is three times as long as a distance p between transducers ($3 \times p = 3p$). Therefore, a relationship among the distance between the transducer B0 and the transducer BR3 ($3 \times p = 3p$), the distance d0 from the target point F to the transducer B0, and the distance d3 from the target point F to the transducer BR3 is represented by following equation (1) by using the triangle theorem.

[Equation 1]

$$(3p)^2 + (d0)^2 = (d3)^2 \qquad (1)$$

Therefore, the distance from the target point F to the transducer BR3 is calculated by following equation (2) by using the distances d0 and 3p.

[Equation 2]

$$d3 = \sqrt{(3p)^2 + (d0)^2} \qquad (2)$$

Therefore, a distance difference $\Delta d'$ between the distance d3 from the target point F to the transducer BR3 and the distance d0 from the target point F to the transducer B0 is calculated by following equation (3).

[Equation 3]

$$\Delta d' = d3 - d0 = \sqrt{(3p)^2 + (d0)^2} - d0 \qquad (3)$$

Herein, when a sound speed in a living body is set to 1530 m/s, if the distance difference $\Delta d'$ is converted to a time difference $\Delta t'$, it is represented as in following equation 4. The time difference $\Delta t'$ is a delay amount in the transducer BR3 with respect to the transducer B0 serving as a reference.

[Equation 4]

$$\Delta t' = \Delta d'/1530 \text{ (m/s)} \qquad (4)$$

Meanwhile, when the above-described calculation is digitally processed, if a sampling frequency is set to 50 MHz, a sampling interval is equivalent to 20 ns (=1/50000 Hz) and 0.0306 mm (=1530×20/1000000). Therefore, delay step number corresponding to the distance difference $\Delta d'$ Delaystep=$\Delta d'$/0.0306 is obtained.

In order for the reflective wave concentrically spread from the target point F to be efficiently received by the transducers, it is preferable that an entire spread reflective wave is received by the transducers and a process in which the signal of the reflective wave in each transducer is added while being delayed by a delay amount for each transducer such as the above-described time difference Δt', that is to say, the phasing adding process is performed. According to this, it becomes possible to detect the signal with a high S/N ratio as the reflective wave detection signal.

Following two conditions should be satisfied for the phasing adding process with a high degree of accuracy to be realized. A first condition is that a relative positional relationship between the transducers is known. From the first condition, the distance difference Δd' can be calculated. A second condition is that the sound speed is supposed to be constant. From the second condition, the time difference Δt' can be calculated.

In general, the sound speed is supposed to be constant, and thus the second condition is satisfied. In order for the first condition to be satisfied, in a case of a probe in which the positional relationship between the transducers is not fixed (hereinafter, referred to as a flexible probe), it is necessary to grasp the relative positional relationship between the transducers in some way. In a case of the flexible probe, it is possible to obtain the relative positional relationship between the transducers by using a sensor and the like as in the method in Patent Document 2 described above, for example, but a configuration is complicated in this case. Therefore, in a method of this technology, transmission and reception of the ultrasonic beam is repeated a plurality of times such that the relative positional relationship between the transducers can be obtained without such sensor mounted. That is to say, in the method of this technology, it becomes possible to realize beam forming with a simple configuration without mounting the sensor even when the flexible probe is adopted.

Summary of Technology

Figure 2:
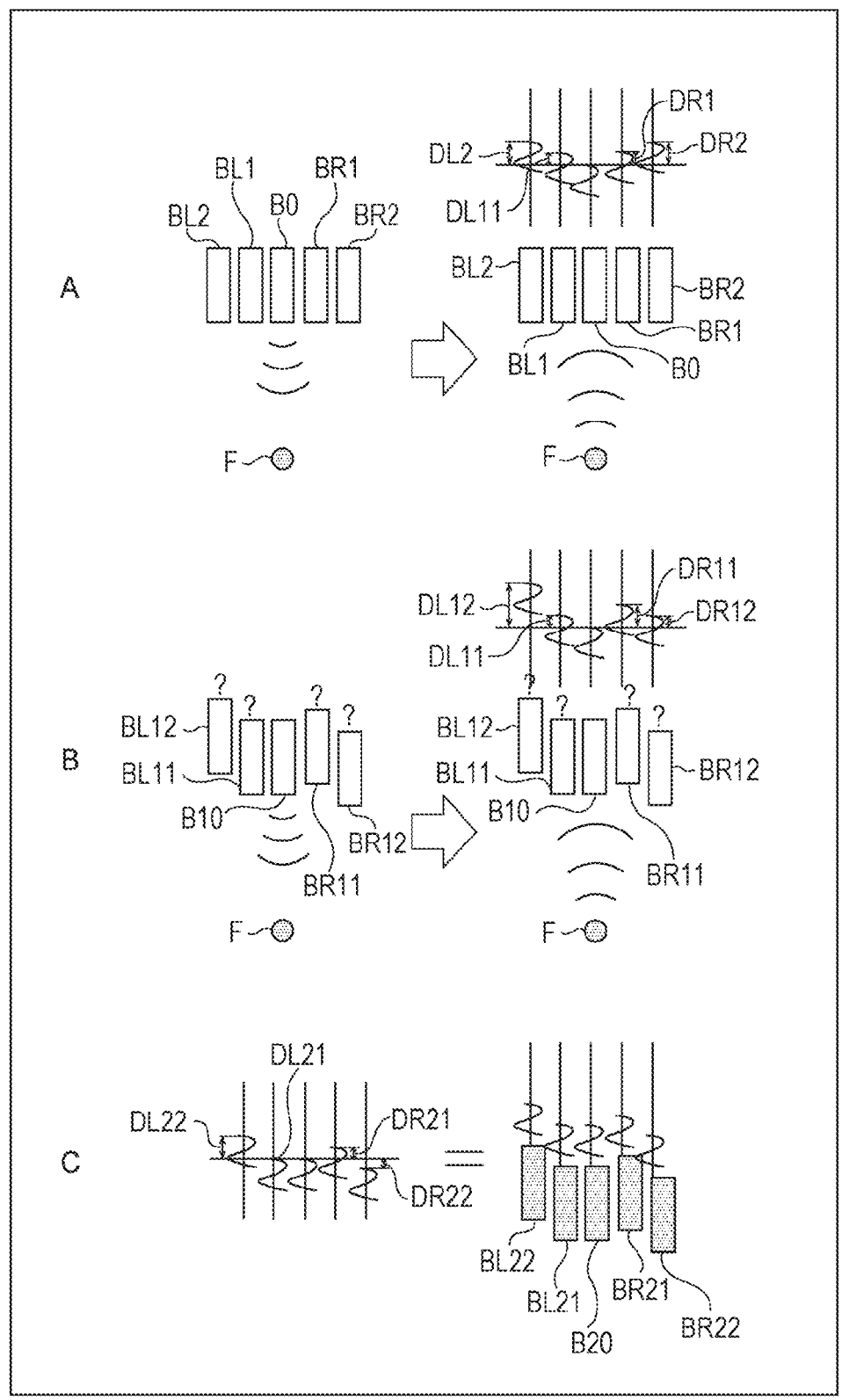
FIGS. 2A to 2C are views illustrating a summary of this technology.

FIGS. 2A to 2C are views illustrating a summary of this technology.

In an example illustrated in FIG. 2A, a plurality of transducers BL2, BL1, B0, BR1, and BR2 is arranged in a state one-dimensionally fixed at a regular interval (hereinafter, referred to as a series fixed state). In this case, the relative positional relationship among the transducers is known. As illustrated in a left side in FIG. 2A, suppose that the ultrasonic beam is transmitted from the transducer B0 in a direction toward the target point F.

Then, the ultrasonic beam transmitted from the transducer B0 strikes the target point F to be reflected as illustrated in a right side in FIG. 2A. At that time, the reflective wave from the target point F is concentrically propagated to arrive at each transducer. Herein, in the case in FIG. 2A, the relative positional relationship among the transducers is known and the reflective wave from the target point F first arrives at the transducer B0 the closest to the target point F as the reception wave, so that the reception wave in the transducer B0 is hereinafter referred to as a reference reception wave. In this case, each of delay amounts (that is to say, phase differences) DL2, DL1, DR1, and DR2 of the reception waves in the transducers BL2, BL1, BR1, and BR2, respectively, with respect to the reference reception wave may be uniquely calculated.

Specifically, in the series fixed state, values become larger in order from the delay amount DL1 in the transducer BL1 located to immediate left of the transducer B0 to the delay amount DL2 in the transducer BL2 located to immediate left of the transducer BL1. Similarly, in the series fixed state, values become larger in order from the delay amount DR1 in the transducer BR1 located to immediate right of the transducer B0 to the delay amount DR2 in the transducer BR2 located to immediate right of the transducer BR1.

In this manner, in the series fixed state, the delay amount of each transducer may be calculated by the known positional relationship, so that it is not necessary to actually measure the same by actually transmitting and receiving the ultrasonic beam.

In contrast, in FIG. 2B, a plurality of transducers BL12, BL11, B10, BR11, and BR12 is arranged in a state in which the relative positional relationship among them is not clear. In a case of FIG. 2B, each of delay amounts DL12, DL11, DR11, and DR12 cannot be calculated by calculation such as equations (1) to (4) described above, so that it is necessary to actually measure them by actually transmitting and receiving the ultrasonic beam.

For example, as illustrated in a left side in FIG. 2B, suppose that the ultrasonic beam is transmitted from the transducer B10 in the direction toward the target point F.

In this case, the ultrasonic beam transmitted from the transducer B10 strikes the target point F to be reflected as illustrated in a right side in FIG. 2B. At that time, the reflective wave from the target point F is concentrically propagated to arrive at the transducers BL12, BL11, B10, BR11, and BR12. Differences in actually measured arrival time of the reception waves in the transducers BL12, BL11, BR11, and BR12 with respect to the reference reception wave at that time are the delay amounts DL12, DL11, DR11, and DR12, respectively.

Differences between the delay amounts DL2, DL1, DR1 and DR2 in a case in which the relative positional relationship among the transducers is known (that is to say, in the series fixed state) (right side in FIG. 2A) and the delay amounts DL12, DL11, DR11, and DR12 calculated by the actual measurement when the relative positional relationship among the transducers is unknown (right side in FIG. 2B), respectively, indicate delay amounts DL22, DL21, DR21, and DR22 indicating the differences in position (that is to say, positional shifts) of the transducers (left side in FIG. 2C).

Each of the delay amounts DL22, DL21, DR21, and DR22 (left side in FIG. 2C) indicating the difference in position (that is to say, the positional shift) of each transducer may be easily converted to the difference in position (that is to say, the positional shift) of each of the transducers BL22, BL21, BR21, and BR22 with respect to the transducer B20 serving as a reference. In this manner, the positional relationship among the transducers, the positional relationship among which is not clear, becomes clear only by simple calculation without adopting the sensor.

The delay amount corresponding to the positional relationship among the transducers calculated in this manner is used in the beam forming, so that a high-quality ultrasonic image may be generated.

Configuration Example of Ultrasonic Diagnostic Device

Figure 3:
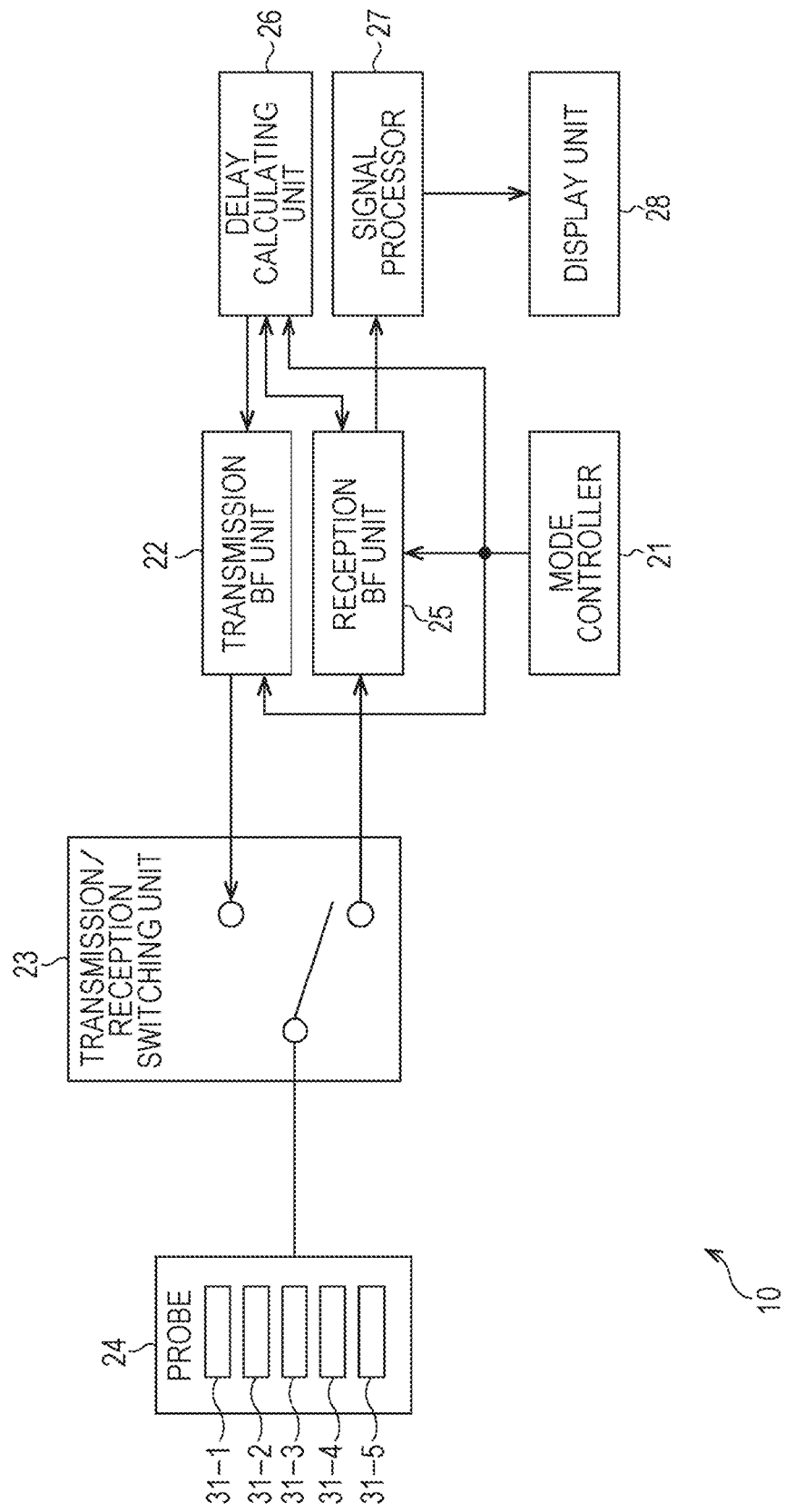
FIG. 3 is a block diagram of a configuration example of an ultrasonic diagnostic device to which this technology is applied.

FIG. 3 is a block diagram of a configuration example of the ultrasonic diagnostic device to which this technology is applied.

As illustrated in FIG. 3, an ultrasonic diagnostic device 10 includes a mode controller 21, a transmission BF (beam forming) unit 22, a transmission/reception switching unit 23, a probe 24, a reception BF unit 25, a delay calculating unit 26, a signal processor 27, and a display unit 28.

The probe 24 includes five transducers 31-1 to 31-5 for simple description in the example in FIG. 3. Meanwhile, if the transducers 31-1 to 31-5 are not necessarily individually described, they are hereinafter collectively referred to as the transducers 31. The relative positional relationship among the transducers 31 is not clear. Although the number of transducers 31 is set to five in the example in FIG. 3, the number is not especially limited thereto.

The mode controller 21 switches a mode of the ultrasonic diagnostic device 10 to any one of a calibration mode and an actual measurement mode. In the calibration mode, a calibration process to calculate the relative positional relationship among the transducers 31 in the probe 24 is executed. In the actual measurement mode, a target to be measured is measured and imaged to be displayed by using the relative positional relationship among the transducers 31 calculated in the calibration mode.

In this embodiment, the relative positional relationship among the transducers 31 is not fixed, so that the calibration process is preferably executed when the position of each transducer 31 changes. For example, it is also possible that the calibration process is performed each time before the measurement of the target to be measured is executed.

The transmission BF unit 22 drives the transducer to form the ultrasonic beam to be transmitted from the transducer in the calibration mode. The transmission BF unit 22 forms the ultrasonic beam to be transmitted from each transducer 31 such that this is transmitted with delay by the delay amount calculated by the delay calculating unit 26 in the actual measurement mode.

The transmission/reception switching unit 23 selects any one of the transmission BF unit 22 and the reception BF unit 25 by switching an embedded switch, thereby switching between the transmission and reception of the ultrasonic beam from the probe 24.

The transducer 31 included in the probe 24 transmits the ultrasonic beam formed by the transmission BF unit 22. The transducer 31 included in the probe 24 also receives the reflective wave corresponding to the transmitted ultrasonic beam and supplies the signal of the received reflective wave to the reception BF unit 25.

The reception BF unit 25 delays the signal of the reflective wave supplied from each transducer 31 based on an arrangement of the transducers 31 serving as a reference (hereinafter, referred to as a reference arrangement) in the calibration mode. The reception BF unit 25 also calculates correlation by a signal sequence of each delayed transducer 31 to calculate the phase difference and supplies the same to the delay calculating unit 26. The reception BF unit 25 generates the reflective wave detection signal by performing the phasing adding process to add the signal of the reflective wave received by each transducer 31 while delaying the same by the delay amount calculated by the delay calculating unit 26 in the actual measurement mode. The reception BF unit 25 supplies the generated reflective wave detection signal to the signal processor 27.

The delay calculating unit 26 takes an average of the phase difference supplied from the reception BF unit 25 and the phase differences supplied in the preceding processes to calculate the phase difference of each transducer 31 in the calibration mode. Then, the delay calculating unit 26 calculates the delay amount used in each of the transmission beam forming and the reception beam forming based on the calculated phase difference and overwrites the calculated delay amount to update the delay amount.

The signal processor 27 generates a signal of the ultrasonic image of the target to be measured based on the reflective wave detection signal supplied from the reception BF unit 25 in the actual measurement mode.

The display unit 28 displays the ultrasonic image based on the signal generated by the signal processor 27 in the actual measurement mode.

Ultrasonic Signal Processing

Next, a series of processes executed by such ultrasonic diagnostic device 10 until the ultrasonic image of the target to be measured is displayed (hereinafter, referred to as ultrasonic signal processing) is described with reference to FIG. 4.

Figure 4:
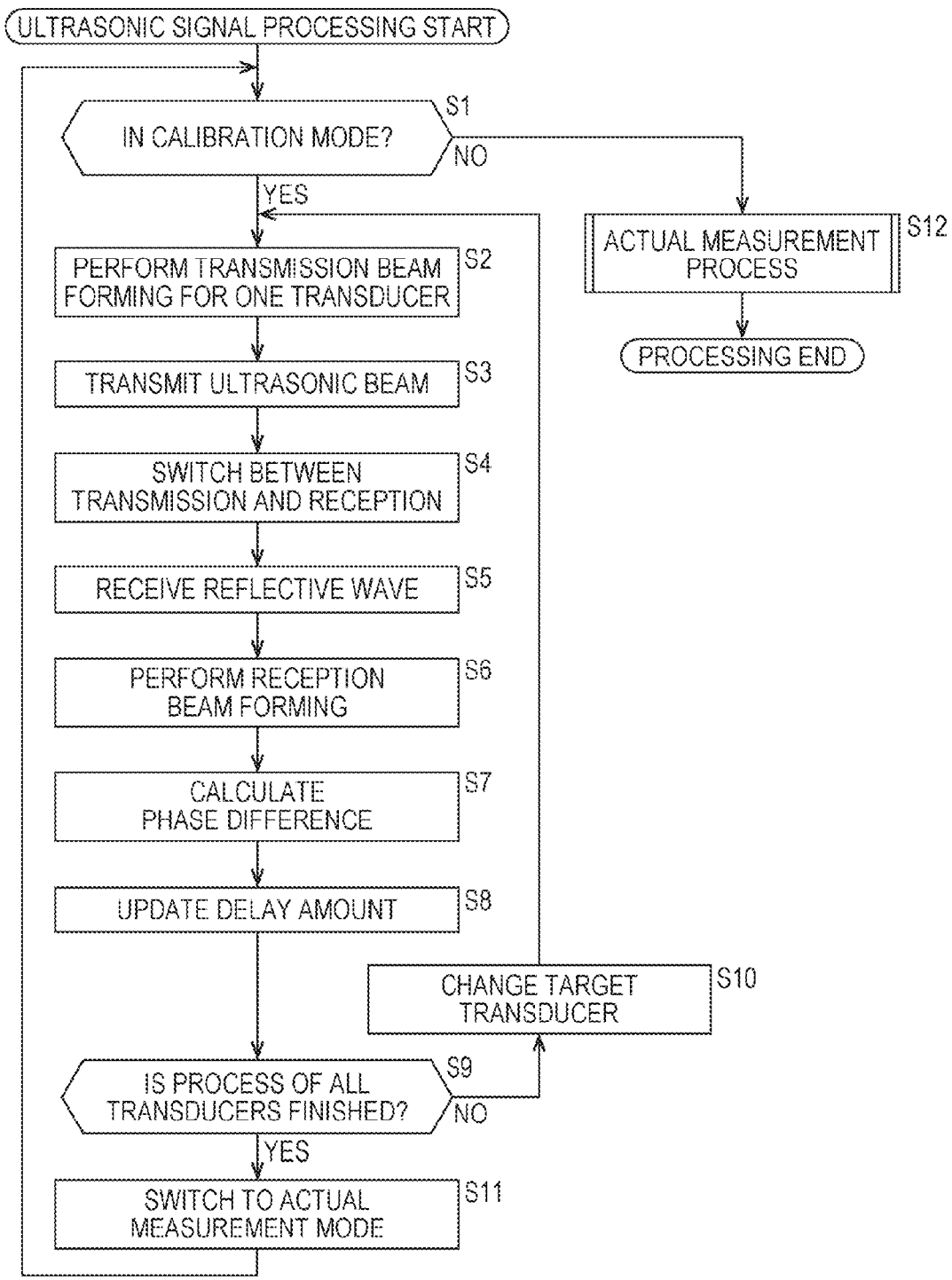
FIG. 4 is a flowchart illustrating a flow of an ultrasonic signal processing.

FIG. 4 is a flowchart illustrating a flow of the ultrasonic signal processing.

At step S1, the mode controller 21 determines whether the mode set upon instruction from a user is the calibration mode.

When the calibration mode is set, it is determined YES at step S1 and the procedure shifts to step S2.

At step S2, the transmission BF unit 22 performs the transmission beam forming for one transducer 31. That is to say, the transmission BF unit 22 drives one transducer 31 as the transducer 31 being a transmission target and forms a signal for transmitting the ultrasonic beam from the transducer 31. At that time, the transmission/reception switching unit 23 switches a position of the switch to a side of the transmission BF unit 22.

At step S3, the transducer 31 being the transmission target of the probe 24 (for example, the transducer 31-1) generates the ultrasonic beam based on the signal formed at step S2 by the transmission BF unit 22 to transmit.

At step S4, the transmission/reception switching unit 23 switches the position of the switch from the side of the transmission BF unit 22 to a side of the reception BF unit 25, thereby switching between the transmission and reception.

At step S5, each transducer 31 receives the reflective wave corresponding to the ultrasonic beam transmitted at step S3. Each transducer 31 supplies the signal of the received reflective wave to the reception BF unit 25.

At step S6, the reception BF unit 25 performs the reception beam forming. That is to say, the reception BF unit 25 delays the signal of the reflective wave supplied from each transducer 31 supposing that the reference arrangement of the transducers 31 is in the series fixed state, that is to say, the arrangement without positional shift.

At step S7, the reception BF unit 25 calculates the phase difference. That is to say, the reception BF unit 25 calculates the correlation by the signal sequence of each transducer 31 delayed at step S6 to calculate the phase difference. The reception BF unit 25 supplies the calculated phase difference to the delay calculating unit 26. More specifically, in the reception beam forming at step S6, a process equivalent to the calculation to obtain the difference between the right side in FIG. 2A and the right side in FIG. 2B is executed and each signal of a left side in FIG. 2C is output. Each phase difference of the signal of the left side in FIG. 2C indicates the positional shift of each transducer 31. That is to say, the phase difference indicating the positional shift of each transducer 31 is calculated by the process at step S7.

At step S8, the delay calculating unit 26 updates the delay amount. The delay calculating unit 26 takes an average of the phase difference (that is to say, the positional shift of each transducer) supplied from the reception BF unit 25 and the phase difference (that is to say, the positional shift of each transducer) supplied by the preceding processes to calculate the phase difference of each transducer 31. Then, the delay calculating unit 26 calculates the delay amount of each of the transmission beam forming and the reception beam forming based on the calculated phase difference (that is to say, the averaged positional shift of each transducer) and overwrites the calculated delay amount to update the delay amount.

At step S9, the transmission BF unit 22 determines whether the process of all the transducers 31 is finished, that is to say, whether the ultrasonic beam is transmitted from all the transducers 31.

If the ultrasonic beam is not transmitted from all the transducers 31 yet, it is determined NO at step S9, and the procedure shifts to step S10.

At step S10, the transmission BF unit 22 changes the transducer 31 being the target of the transmission beam forming. For example, this is changed to the next transducer 31-2. Thereafter, the procedure returns to step S2 and the subsequent processes are repeated. That is to say, the transmission beam forming by each of all the transducers 31 is repeatedly executed, and a loop process from step S2 to step S10 is repeated each time, so that the delay amount of the transmission beam forming and the reception beam forming is updated.

If the process of all the transducers 31 is finished, it is determined YES at step S9, and the procedure shifts to step S11.

At step S11, the mode controller 21 switches to the actual measurement mode. Then, the procedure returns to step S1.

At step S1, the mode controller 21 determines whether the set mode is the calibration mode.

In this case, the actual measurement mode is set, so that it is determined NO at step S1 and the procedure shifts to step S12.

At step S12, the ultrasonic diagnostic device 20 performs an actual measurement process. The actual measurement process is described in detail with reference to FIG. 5.

Figure 5:
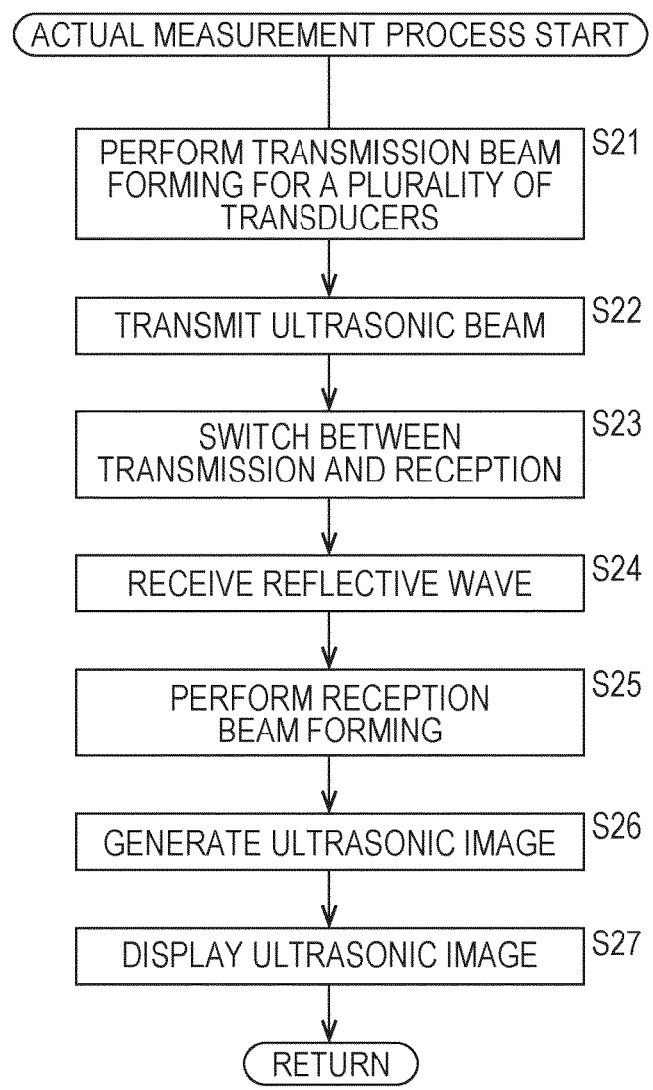
FIG. 5 is a flowchart illustrating a flow of an actual measurement process.

FIG. 5 is a flowchart illustrating a flow of the actual measurement process.

At step S21, the transmission BF unit 22 performs the transmission beam forming for a plurality of transducers 31. That is to say, the transmission BF unit 22 generates the signal for forming the ultrasonic beam to be transmitted from each transducer 31 such that the ultrasonic beam to be transmitted from each transducer 31 is transmitted with delay by the delay amount calculated by the delay calculating unit 26 at step S8 of a last cycle (that is to say, an immediately preceding cycle) (that is to say, final update in the calibration process). At that time, the transmission/reception switching unit 23 switches the position of the switch to the side of the transmission BF unit 22.

At step S22, each transducer 31 generates the ultrasonic beam based on the signal formed at step S21 by the transmission BF unit 22 to transmit.

At step S23, the transmission/reception switching unit 23 switches the position of the switch from the side of the transmission BF unit 22 to the side of the reception BF unit 25, thereby switching between the transmission and reception.

At step S24, each transducer 31 receives the reflective wave corresponding to the ultrasonic beam transmitted at step S22. Each transducer 31 supplies the signal of the received reflective wave to the reception BF unit 25.

At step S25, the reception BF unit 25 performs the reception beam forming. That is to say, the reception BF unit 25 generates the reflective wave detection signal by aligning the phases of the reception waves by performing the phasing adding process to add the signal of the reflective wave received by each transducer 31 while delaying the same by the delay amount updated by the delay calculating unit 26 at step S8 of the last cycle (that is to say, the immediately preceding cycle) (that is to say, the final update in the calibration process). The reception BF unit 25 supplies the reflective wave detection signal to the signal processor 27.

At step S26, the signal processor 27 generates the signal of the ultrasonic image of the target to be measured based on the reflective wave detection signal supplied from the reception BF unit 25.

At step S27, the display unit 28 displays the ultrasonic image based on the signal generated by the signal processor 27 at step S26. The actual measurement process is then finished.

With reference to the flowchart in FIG. 4 again, when the above-described actual measurement process at step S12 is finished, the ultrasonic signal processing is finished.

Second Calibration Process

In the calibration process (hereinafter, referred to as a first calibration process) in an example in FIG. 4, the number of transducers 31 from which the ultrasonic beam is transmitted in single transmission beam forming, that is to say, the number of transducers 31 being the transmission target is one. However, in this case, the ultrasonic beam transmitted from one transducer 31 is diffused, so that this might strike not only the target point F just below in a transmitting direction but also the target points in various positions to be reflected. When the transducer 31 being a reception target receives the reflective waves from the target points in the various positions, a degree of accuracy of the first calibration process is deteriorated and it is feared that the relative positional relationship among the transducers 31 is not correctly calculated.

Therefore, the ultrasonic diagnostic device 10 may execute a second calibration process to make a group of a plurality of transducers 31 the transducers 31 being the transmission targets in single transmission beam forming and transmit the ultrasonic beam from the plurality of transducers 31. The ultrasonic diagnostic device 10 executes a repetitive process of such second calibration process while changing the group of a plurality of transducers 31. According to this, a degree of accuracy in calculation of the relative positional relationship among the transducers 31 may be further improved. The second calibration process is described with reference to FIGS. 6 to 8.

Figure 6:
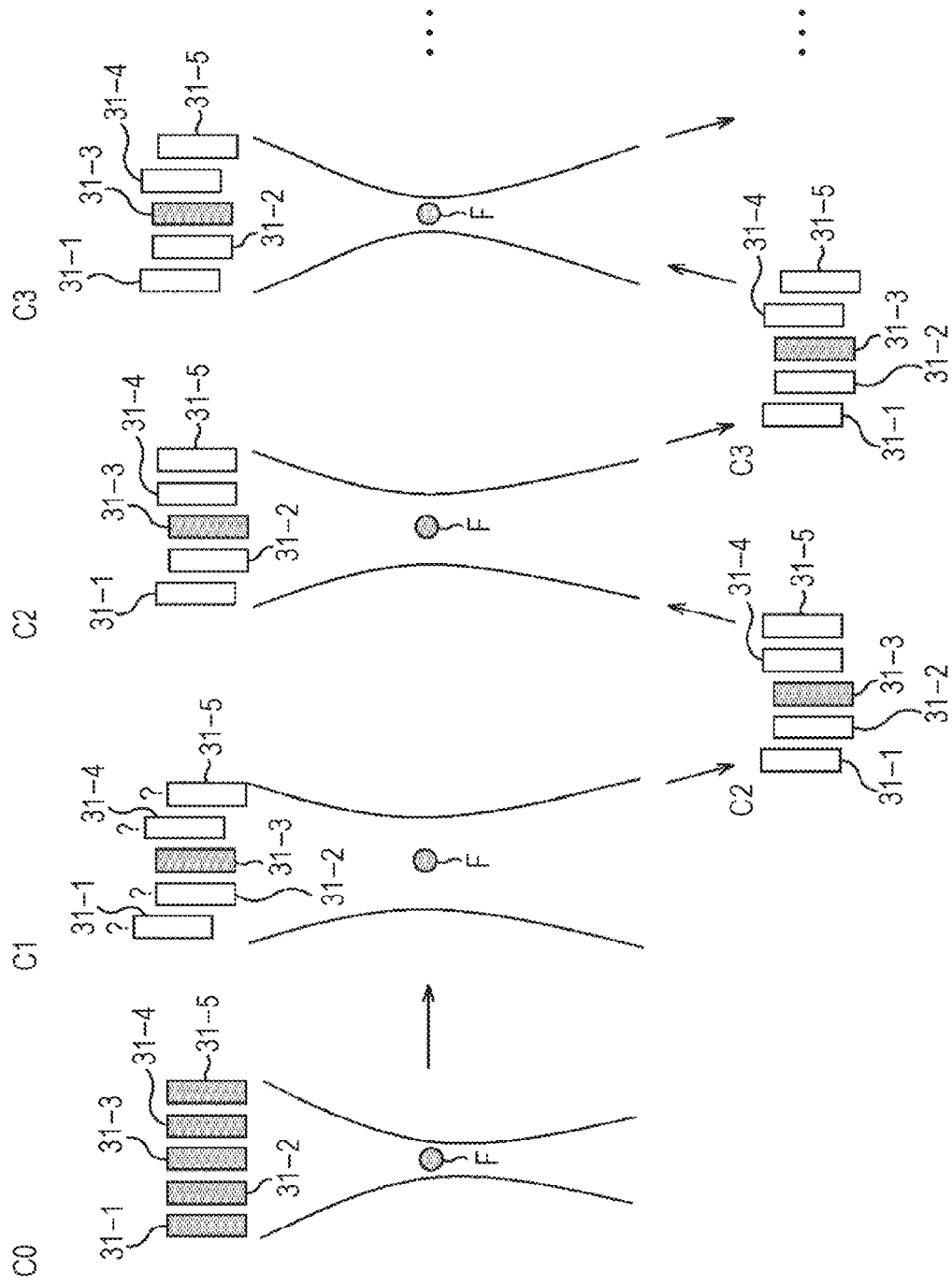
FIG. 6 is a view of an arrangement of the transducers in a calibration process using a plurality of transducers.

FIG. 6 is a view of an arrangement of the transducers in the second calibration process. In FIG. 6, the second calibration process is repeatedly executed for the five transducers 31-1 to 31-5 as one group.

Specifically, a state C1 in FIG. 6 indicates an actual arrangement state of the transducers 31-1 to 31-5. However, the arrangement of the transducers 31-1 to 31-5 is not estimated yet and the relative positional relationship among them is not yet clear.

First, the transmission BF unit 22 forms the signal of the ultrasonic beam supposing that the arrangement of the transducers 31-1 to 31-5 is in the series fixed state as indicated in a state C0, that is to say, supposing that the series fixed state as the reference arrangement. Then, the ultrasonic beam is transmitted from the transducers 31-1 to 31-5 supposed to be in the arrangement in the state C0.

Then, the reception BF unit 25 and the delay calculating unit 26 perform the reception beam forming for each of the reception waves of the transducers 31-1 to 31-5 and calculate the phase difference (that is to say, an estimated amount of the positional shift of each transducer 31) based on the correlation of each output signal. A state indicating estimated positions of the arrangement of the transducers 31-1 to 31-5 based on the phase difference calculated in this manner is a state C2 in FIG. 6.

Herein, the ultrasonic beam transmitted from the transducers 31-1 to 31-5 supposed to be in the arrangement in the state C0 strikes the target point F to be reflected. However, in this case, the ultrasonic beam transmitted from the transducers 31-1 to 31-5 is subjected to the beam forming (the signal of the ultrasonic beam is formed) in the supposed arrangement, so that this is not correctly narrowed and diffused, and this also strikes the target point other than the target point F to be reflected. Therefore, the phase difference calculated based on the reflective wave from the target point F includes much noise and a degree of accuracy thereof is low. That is to say, an error of the estimated positions of the arrangement of the transducers 31-1 to 31-5 (that is to say, the estimated amounts of the positional shift) indicated in the state C0 in FIG. 6 from the actual arrangement positions (that is to say, the actual positional shifts) is large.

Therefore, the transmission BF unit 22 next forms the signal of the ultrasonic beam supposing that the arrangement of the transducers 31-1 to 31-5 is in the state C2, that is to say, supposing that the state C2 is the reference arrangement. Specifically, the arrangement positions of the transducers 31-1 and 31-5 in the state C1 are virtually changed to suppose the arrangement in the state C2. Then, the ultrasonic beam is transmitted from the transducers 31-1 to 31-5 supposed to be in the arrangement in the state C2.

Then, the reception BF unit 25 and the delay calculating unit 26 perform the reception beam forming for each of the reception waves of the transducers 31-1 to 31-5 and calculate again the phase difference (that is to say, the estimated amount of the positional shift of each transducer 31) based on the correlation of each output signal. A state indicating the estimated positions of the arrangement of the transducers 31-1 to 31-5 based on the phase difference calculated again in this manner is a state C3 in FIG. 6.

Herein, the error of the estimated positions of the arrangement of the transducers 31-1 to 31-5 (that is to say, the estimated amounts of the positional shift) indicated in the state C3 from the actual arrangement positions (that is to say, the actual positional shifts) is smaller than the error in the case of the arrangement in the state C2. A reason for this is as follows.

That is to say, the ultrasonic beam transmitted from the transducers 31-1 to 31-5 supposed to be in the arrangement in the state C2 strikes the target point F to be reflected. In this case also, the ultrasonic beam transmitted from the transducers 31-1 to 31-5 strikes the target point other than the target point F to be reflected. However, the ultrasonic beam transmitted when the arrangement of the transducers 31 is supposed to be the arrangement in the state C2 is narrowed as compared to the ultrasonic beam transmitted when the arrangement of the transducers 31 is supposed to be the arrangement in the state C0. Therefore, the reflective wave from the target point other than the target point F of the ultrasonic beam transmitted when the arrangement of the transducers 31 is supposed to be the arrangement in the state C2 decreases.

Then, the transmission BF unit 22 next forms the signal of the ultrasonic beam supposing that the arrangement of the transducers 31-1 to 31-5 is in the state C3, that is to say, supposing that the state C3 is the reference arrangement. Specifically, the arrangement position of the transducer 31-5 in the state C2 is virtually changed to suppose the arrangement in the state C3. Then, the ultrasonic beam is transmitted from the transducers 31-1 to 31-5 supposed to be in the arrangement in the state C3.

In this manner, it is possible to narrow the ultrasonic beam transmitted from each transducer 31 by repeatedly executing the second calibration process to calculate the phase difference (that is to say, the estimated amount of the positional shift) while making the estimated position of the arrangement position of each transducer 31 closer to a correct position (that is to say, an actual arrangement position). That is to say, a wave front is synthesized by the ultrasonic beam transmitted from each transducer 31 and a state is such that the ultrasonic beam is transmitted from the transducers 31 virtually arranged in a concave manner, so that the ultrasonic beam is narrowed. According to this, the reflective wave from the target point other than the target point F decreases, so that a degree of accuracy of the second calibration process may be improved.

A fact that the ultrasonic beam transmitted from each transducer 31 is narrowed is equivalent to a fact that a sound pressure is concentrated. Therefore, the sound pressure of the reflective wave from the target point F also becomes high. Further, since the estimated position of the arrangement position of each transducer 31 gets closer to the correct position (that is to say, the actual arrangement position), the phase difference in the phasing adding process by the reception BF unit 25 becomes smaller, so that the sound pressure to be added becomes higher. Therefore, a degree of accuracy of the measurement of the target to be measured may be improved.

Number of Repetitions of Second Calibration Process

Herein, the number of repetitions of the second calibration process is described.

Figure 7:
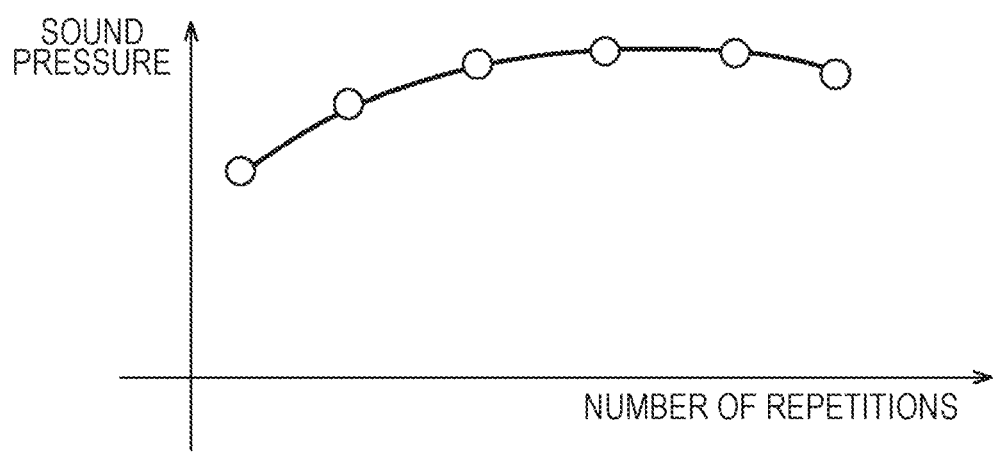
FIG. 7 is a view of a relationship between the number of repetitions of a second calibration process and a sound pressure of a reflective wave from a target point F.

FIG. 7 is a view of a relationship between the number of repetitions of the second calibration process and the sound pressure of the reflective wave from the target point F. In FIG. 7, the sound pressure of the reflective wave from the target point F is represented along an ordinate axis and the number of repetitions of the second calibration process is represented along an abscissa axis.

As illustrated in FIG. 7, the sound pressure of the reflective wave from the target point F changes as the number of repetitions of the second calibration process to calculate the phase difference (that is to say, the estimated amount of the positional shift) increases while the estimated position of the arrangement position of each transducer 31 is changed to be closer to the correct position (that is to say, the actual arrangement position).

Herein, as described above, the sound pressure of the reflective wave from the target point F becomes higher as the estimated position of the arrangement position of each transducer 31 gets closer to the correct position (that is to say, the actual arrangement position). That is to say, while the estimated position of the arrangement position of each transducer 31 gets closer to the correct position, the sound pressure changes in an increasing direction (positive direction). Ideally, when the estimated position of the arrangement position of each transducer 31 conforms to the correct position, the sound pressure of the reflective wave from the target point F reaches the highest value, and if the estimated position of the arrangement position of each transducer 31 remains conforming to the correct position, the sound pressure also does not change while keeping the highest value even if the process of the second calibration is repeated thereafter. That is to say, when a change amount of the sound pressure of the reflective wave from the target point F almost disappears, the repetition of the second calibration may be stopped supposing that the estimated position of the arrangement position of each transducer 31 substantially conforms to the correct position. Alternatively, if the direction of the change in sound pressure of the reflective wave from the target point F changes from the increasing direction (positive direction) to a decreasing direction (negative direction), this means that the estimated position of the arrangement position of each transducer 31 gets away from the correct position, so that the repetition of the second calibration may be stopped when the direction of the change in sound pressure changes to the negative direction (that is to say, at a point of reverse).

Therefore, the number of repetitions of the second calibration process may be determined by using a fact that the change amount of the sound pressure of the reflective wave from the target point F becomes smaller than a predetermined threshold or that the direction of the change changes to the negative direction as a convergence condition. Meanwhile, in this case, an upper limit of the number of repetitions of the second calibration process is also determined in advance.

Next, a method of determining the target point F used in the above-described convergence condition is described. A distance between the target point F to be used as the convergence condition and the transducers 31 arranged in line may be determined in a following manner, for example.

A plurality of sets of a central point and two points shifted right and left from the central point in a horizontal direction by one pixel is extracted. Next, the sound pressures of the three points are obtained for each set and the set in which the sound pressure of the central point is the highest is extracted as a candidate of the set including the target point F. In this case, since a number of candidates are extracted in a vertical direction, the central point with the highest sound pressure out of the candidates is determined as the target point F.

Ultrasonic Signal Processing

Next, the ultrasonic signal processing including the second calibration process is described with reference to FIG. 8.

Figure 8:
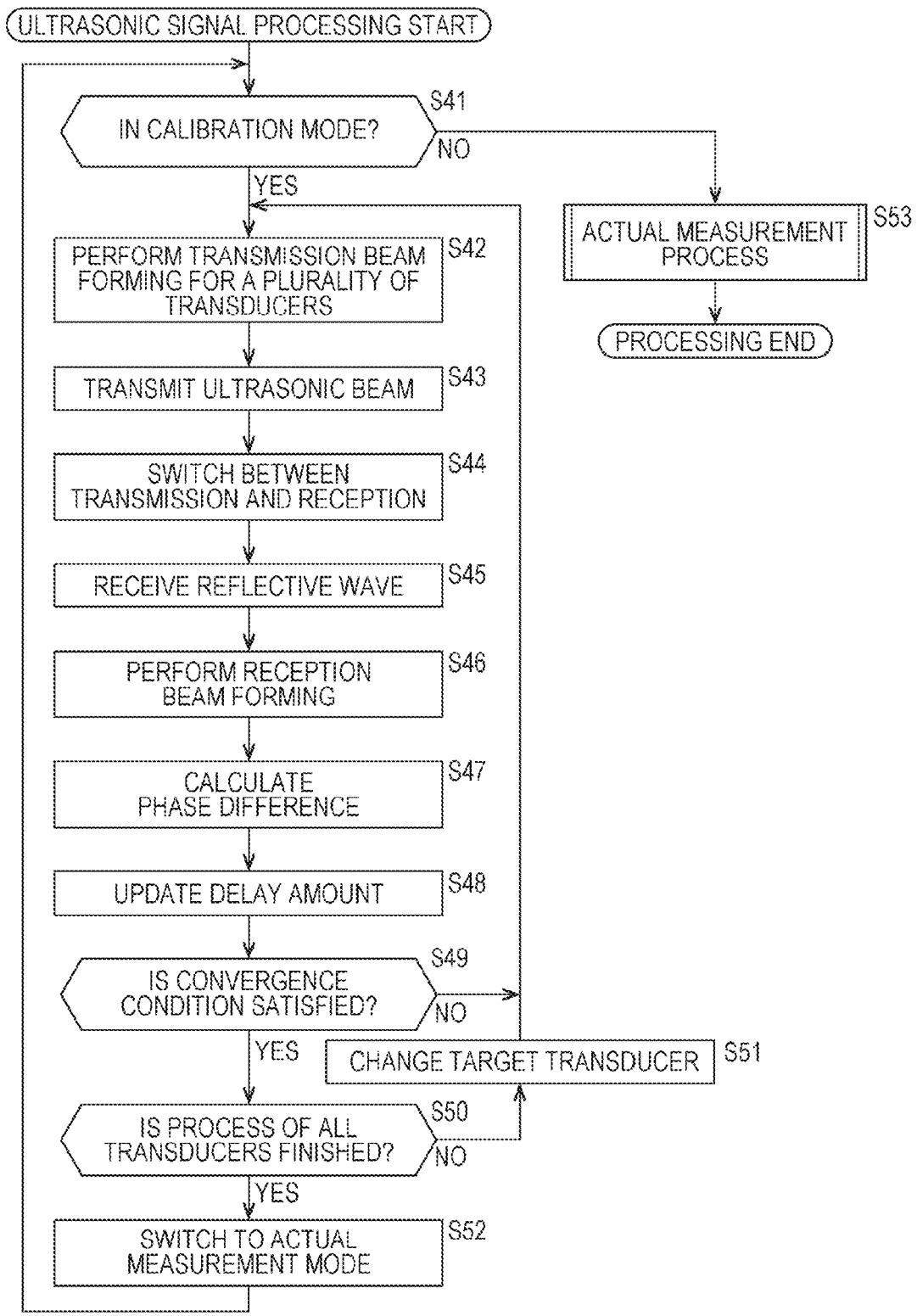
FIG. 8 is a flowchart illustrating a flow of the ultrasonic signal processing including the second calibration process.

FIG. 8 is a flowchart illustrating a flow of the ultrasonic signal processing including the second calibration process.

At step S41, the mode controller 21 determines whether the mode set upon instruction from the user is the calibration mode.

When the calibration mode is set, it is determined YES at step S41 and the procedure shifts to step S42.

At step S42, the transmission BF unit 22 performs the transmission beam forming for a plurality of transducers. That is to say, the transmission BF unit 22 drives a plurality of transducers as the transducers being the transmission targets and forms the signal for transmitting the ultrasonic beam supposing that the reference arrangement of the plurality of transducers is in the series fixed state, that is to say, the arrangement without the positional shift, in a first process at step S42. In second and subsequent processes at step S42, the transmission BF unit 22 drives a plurality of transducers as the transducers being the transmission targets, supposes that the plurality of transducers are in a state of the arrangement positions of the transducers 31 specified by the phase differences calculated by the process at step S47 of an immediately preceding cycle (that is to say, the estimated positions of the arrangement positions of the transducers 31), and forms the signal for transmitting the ultrasonic beam by making the arrangement positions the reference arrangement. At that time, the transmission/reception switching unit 23 switches the position of the switch to the side of the transmission BF unit 22.

At step S43, a plurality of transducers 31 of the probe 24 (for example, the transducers 31-1 to 31-5) generates the ultrasonic beam based on the signal formed at step S42 by the transmission BF unit 22 to transmit.

At step S44, the transmission/reception switching unit 23 switches the position of the switch from the side of the transmission BF unit 22 to the side of the reception BF unit 25, thereby switching between the transmission and reception.

At step S45, each transducer 31 receives the reflective wave corresponding to the ultrasonic beam transmitted at step S43. Each transducer 31 supplies the signal of the received reflective wave to the reception BF unit 25.

At step S46, the reception BF unit 25 performs the reception beam forming. That is to say, the reception BF unit 25 delays the signal of the reflective wave supplied from each transducer 31 supposing that the reference arrangement of the transducers 31 is in the series fixed state in the first process at step S46. The reception BF unit 25 delays the signal of the reflective wave supplied from each transducer 31 supposing that the reference arrangement of the transducers 31 is in the state of the arrangement positions of the transducers 31 specified by the phase differences calculated by the process at step S47 of the immediately preceding cycle (that is to say, the estimated positions of the arrangement positions of the transducers 31) in second and subsequent processes at step S46.

At step S47, the reception BF unit 25 calculates the phase difference. That is to say, the reception BF unit 25 calculates the correlation by the signal sequence of each transducer 31 delayed at step S46 to calculate the phase difference. The reception BF unit 25 supplies the calculated phase difference to the delay calculating unit 26.

At step S48, the delay calculating unit 26 updates the delay amount. The delay calculating unit 26 takes an average of the phase difference (that is to say, the positional shift of each transducer) supplied from the reception BF unit 25 and the phase difference (that is to say, the positional shift of each transducer) supplied by the preceding processes to calculate the phase difference of each transducer 31. Then, the delay calculating unit 26 calculates the delay amount of each of the transmission beam forming and the reception beam forming based on the calculated phase difference (that is to say, the averaged positional shift of each transducer) and overwrites the calculated delay amount to update the delay amount.

At step S49, the reception BF unit 25 determines whether the convergence condition is satisfied. That is to say, the reception BF unit 25 determines whether the change amount of the sound pressure of the reflective wave from the target point F becomes smaller than the predetermined threshold or a negative value.

When the convergence condition is not satisfied, it is determined NO at step S49 and the procedure is returned to step S42, then the subsequent processes are repeated. That is to say, a loop process from step S42 to step S49 is repeated until the convergence condition is satisfied. Meanwhile, while the loop process from step S42 to step S49 is repeated, the phase difference is calculated while the estimated position of the arrangement position of each transducer 31 is changed to be closer to the actual arrangement position. Then, the delay amount is updated based on the calculated phase difference.

Thereafter, when the convergence condition is satisfied, it is determined YES at step S49 and the procedure shifts to step S50.

At step S50, the transmission BF unit 22 determines whether the process of all the transducers 31 is finished, that is to say, whether the process to transmit the ultrasonic beam from the group of a plurality of transducers 31 is performed for all the groups.

If the ultrasonic beam is not transmitted from all the transducers 31 yet, it is determined NO at step S50, and the procedure shifts to step 51.

At step S51, the transmission BF unit 22 changes the group of the transducers 31 being the targets of the transmission beam forming. For example, this is changed to next transducers 31-6 to 31-10 not illustrated. Thereafter, the procedure returns to step S42 and the subsequent processes are repeated. That is to say, the transmission beam forming by all the groups of the transducers 31 is repeatedly executed, and a loop process from step S42 to step S51 is repeated each time, so that the delay amount of each of the transmission beam forming and the reception beam forming is updated.

If the process of all the transducers 31 is finished, it is determined YES at step S50, and the procedure shifts to step S52.

At step S52, the mode controller 21 switches to the actual measurement mode. Then, the procedure returns to step S41.

At step S41, the mode controller 21 determines whether the set mode is the calibration mode.

In this case, the actual measurement mode is set, so that it is determined NO at step S41 and the procedure shifts to step S53.

At step S53, the ultrasonic diagnostic device 20 performs the actual measurement process. The actual measurement process is already described in detail with reference to FIG. 5, so that the overlapping description thereof is omitted.

When the actual measurement process at step S53 is finished, the ultrasonic signal processing including the second calibration process is finished.

In this manner, it is possible to narrow the ultrasonic beam transmitted from each transducer 31 by repeatedly executing the second calibration process to calculate the phase difference (that is to say, the estimated amount of the positional shift) while making the estimated position of the arrangement position of each transducer 31 closer to the correct position (that is to say, the actual arrangement position). According to this, the reflective wave from the target point other than the target point F decreases, so that the degree of accuracy of the second calibration process may be improved. The phase difference in the phasing adding process by the reception BF unit 25 decreases and the sound pressure to be added becomes higher, so that it is possible to improve the degree of accuracy of the measurement of the target to be measured.

Meanwhile, it is also possible that the ultrasonic signal processing including the first calibration process in FIG. 4 is executed before the ultrasonic signal processing including the second calibration process in FIG. 8 is executed. In this case, the relative positional relationship among the transducers 31 is first calculated by the ultrasonic signal processing including the first calibration process. Therefore, the ultrasonic signal processing including the second calibration process is executed while making the calculated positional relationship an initial state of the estimated position of the arrangement of each transducer 31, so that it is possible to further improve the degree of accuracy of the second calibration process.

Transducers in Two-Dimensional Arrangement

The transducers 31 may be in one-dimensional array as described above or this may be in two-dimensional array. Microstructural transducers mounted on a cMUT (capacitive micro-machined ultrasonic transducers) may be adopted, for example, as a plurality of transducers 31 in the two-dimensional array. The cMUT is an ultrasonic transducer in which each microstructural transducer is mounted on a flexible substrate by MEMS (micro-electro-mechanical systems) technology. A shape of each transducer 31 in the cMUT is not especially limited and may be a shape illustrated in FIGS. 9A and 9B, for example.

Figure 9:
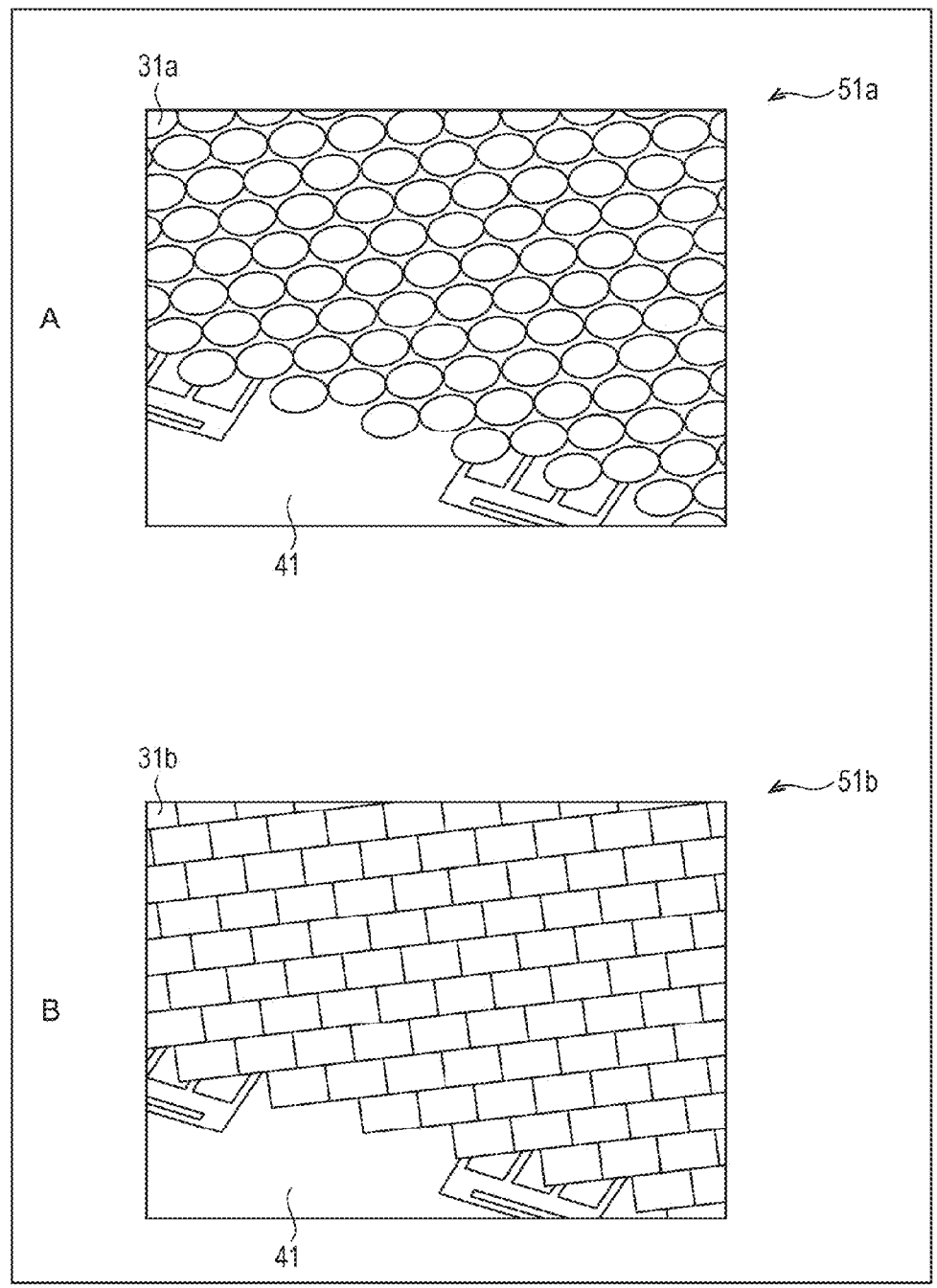
FIGS. 9A and 9B are views of cMUT.

FIGS. 9A and 9B are views of the cMUT. FIG. 9A illustrates a cMUT 51a obtained by mounting a circular transducer 31a on the flexible substrate 41. FIG. 9B illustrates a cMUT 51b obtained by mounting a square transducer 31b on the flexible substrate 41.

A shape of the flexible substrate 41 used in the cMUT may be freely changed. Therefore, when the cMUT is used as the probe 24, the shape may be formed into a belt-shape, a strip-shape, a sheet-shape and the like. However, in the cMUT, each transducer 31 has a microstructure, so that it is difficult to mount a sensor on each transducer 31 for calculating the positional relationship among the transducers 31. Therefore, it becomes possible to calculate the positional relationship among the transducers 31 without mounting the sensor by applying the method of this technology to the cMUT.

The ultrasonic signal processing in a case in which the method of this technology is applied to the cMUT is basically similar to the above-described processing. However, in this case, each transducer 31 has the microstructure, it is possible to suppose that the positional relationship among adjacent transducers 31 is substantially planar. Therefore, in the ultrasonic signal processing including the second calibration process, it is possible to improve the degree of accuracy of the second calibration process without increasing the number of repetitions of the second calibration process.

In the second calibration process, if the positional relationship among the transducers 31 is unknown, when the ultrasonic beam is transmitted from many transducers 31, the error of the estimated position of the arrangement of the transducer 31 from the actual arrangement position of the transducer 31 is large. However, when it is supposed that the adjacent transducers 31 are in the planar relationship, it is possible to inhibit the error in estimation of the arrangement of the transducer 31 to a certain degree. Therefore, it is possible to improve the degree of accuracy of the second calibration process even when the second calibration process is performed only once.

Functional Block

Further, for example, it is also possible to define a plurality of functional blocks such that a plurality of transducers 31, the positional relationship among which is fixed, is made one group (hereinafter, such group is referred to as a functional block) and calculate the positional relationship among the plurality of functional blocks by the method of this technology.

Figure 10:
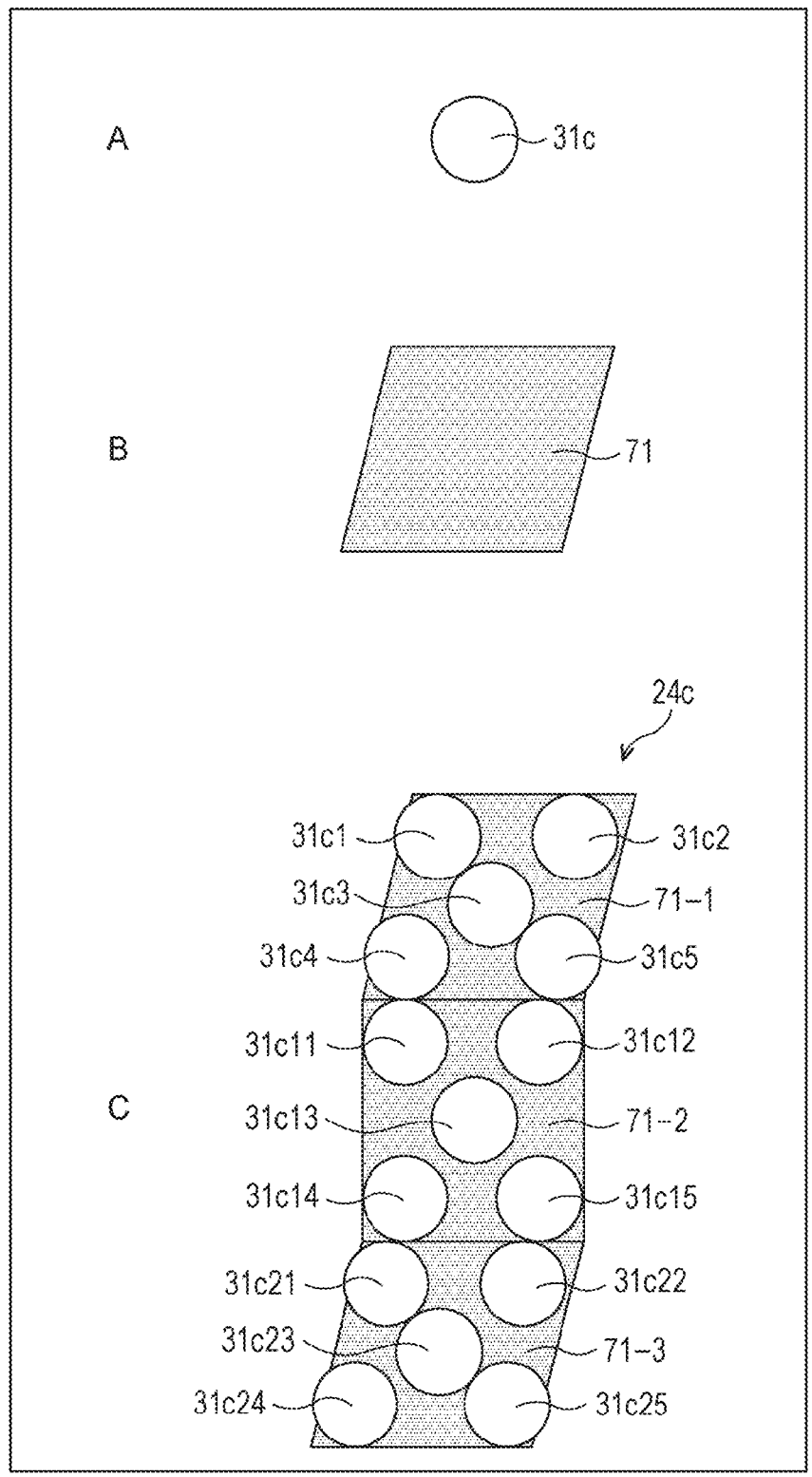
FIGS. 10A to 10C are views of a probe including a plurality of functional blocks.

FIGS. 10A to 10C are views of the probe including a plurality of functional blocks.

FIG. 10A illustrates a circular transducer 31c. Meanwhile, a shape of the transducer 31c is not especially limited to circular. FIG. 10B illustrates a functional block 71. FIG. 10C illustrates a probe 24c formed of a total of 15 transducers 31c. The probe 24c is formed of three functional blocks 71-1 to 71-3. Each of the functional blocks 71-1 to 71-3 includes five transducers 31. Specifically, the functional block 71-1 includes transducers 31c1 to 31c5. The functional block 71-2 includes transducers 31c11 to 31c15. The functional block 71-3 includes transducers 31c21 to 31c25.

The five transducers 31c included in each of the functional blocks 71-1 to 71-3 are physically fixed and positional relationship among them does not change. Meanwhile, the five transducers 31c can be physically fixed by connection among the transducers 31c. In the functional blocks 71-1 to 71-3, the substrate on which the five transducers 31c are mounted may be a non-flexible substrate and the five transducers 31c may be physically fixed by being mounted on the non-flexible substrate.

In the probe 24c having such a configuration, the transmission BF unit 22 executes the calibration process to transmit the ultrasonic beam in units of each of the functional blocks 71-1 to 71-3 in single transmission beam forming. Then, the reception BF unit 25 and the delay calculating unit 26 perform the reception beam forming for the reception wave in units of each of the functional blocks 71-1 to 71-3 and calculate the phase difference for each unit based on the correlation of each output signal. It is possible to calculate the relative positional relationship among the units, that is to say, the relative positional relationship among the adjacent functional blocks 71-1 to 71-3 based on the phase difference calculated for each unit in this manner.

In this manner, in the method of this technology, the relative positional relationship among the transducers may be obtained without such sensor mounted. Therefore, in the method of this technology, it becomes possible to realize the beam forming with a simple configuration without the sensor mounted even when the flexible probe is adopted.

Application of Technology to Program

The above-described series of processes can be executed by hardware or by software. When a series of processes is executed by the software, a program which forms the software is installed on a computer. Herein, the computer includes the computer embedded in dedicated hardware, a general-purpose personal computer, for example, capable of executing various functions by various programs installed and the like.

Figure 11:
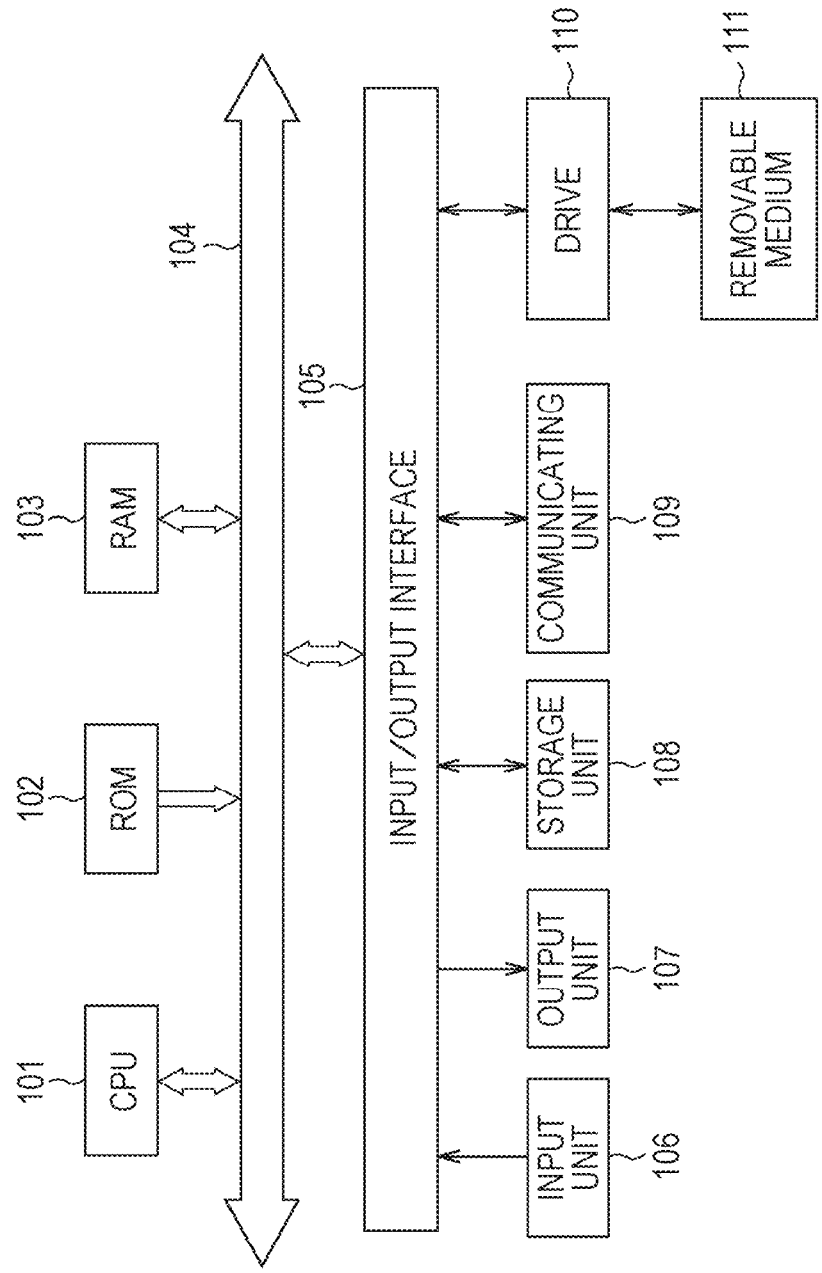
FIG. 11 is a block diagram of a configuration example of hardware of a signal processing device to which this technology is applied.

FIG. 11 is a block diagram of a configuration example of the hardware of the computer which executes the above-described series of processes by the program.

In the computer, a CPU (central processing unit) 101, a ROM (read only memory) 102, and a RAM (random access memory) 103 are connected to one another through a bus 104.

An input/output interface 105 is further connected to the bus 104. An input unit 106, an output unit 107, a storage unit 108, a communicating unit 109, and a drive 110 are connected to the input/output interface 105.

The input unit 106 is formed of a keyboard, a mouse, a microphone and the like. The output unit 107 is formed of a display, a speaker and the like. The storage unit 108 is formed of a hard disk, a non-volatile memory and the like. The communicating unit 109 is formed of a network interface and the like. The drive 110 drives a removable medium 111 such as a magnetic disk, an optical disk, a magnetooptical disk, and a semiconductor memory.

In the computer configured as in the above-described manner, the CPU 101 loads the program stored in the storage unit 108 on the RAM 103 through the input/output interface 105 and the bus 104 to execute, for example, thereby performing the above-described series of processes.

The program executed by the computer (CPU 101) may be recorded on the removable medium 111 as a package medium and the like to be provided, for example. The program may also be provided through a wired or wireless transmission medium such as a local area network, the Internet, digital satellite broadcasting and the like.

In the computer, the program may be installed on the storage unit 108 through the input/output interface 105 by mount of the removable medium 111 on the drive 110. Also, the program may be received by the communicating unit 109 through the wired or wireless transmission medium to be installed on the storage unit 108. In addition, the program may be installed in advance on the ROM 102 and the storage unit 108.

Meanwhile, the program executed by the computer may be the program of which processes are chronologically performed in order described in this specification or the program of which processes are performed in parallel or at a required timing such as when this is called.

The embodiment of this technology is not limited to the above-described embodiment and various modifications may be made without departing from the scope of this technology.

For example, this technology may have a configuration of cloud computing in which one function is shared by a plurality of devices through the network for cooperative processing.

The steps described in the above-described flowchart may be executed by one device or by a plurality of devices in a shared manner.

Further, when a plurality of processes is included in one step, a plurality of processes included in one step may be executed by one device or by a plurality of devices in a shared manner.

Meanwhile, this technology may also have a following configuration.

(1)

A signal processing device including:

a phase difference calculating unit which calculates a phase difference indicating a relative positional shift between a plurality of transducers based on a difference between each phase difference of a signal of a reflective wave in each of the plurality of transducers of an ultrasonic wave transmitted from a transducer being a transmission target out of the plurality of transducers, relative positions of which are not fixed, and each known phase difference of the signal of the reflective wave in each of the plurality of transducers when an arrangement of the plurality of transducers is supposed to be a reference arrangement; and a delay calculating unit which calculates a delay amount of each of the plurality of transducers used in beam forming based on the phase difference calculated by the phase difference calculating unit.

(2)

The signal processing device according to (1) described above, wherein one of the plurality of transducers is selected as the transmission target each time the phase difference calculating unit calculates the phase difference indicating the positional shift.

(3)

The signal processing device according to (1) or (2) described above, wherein two or more of the plurality of transducers are selected as transmission targets each time the phase difference calculating unit calculates the phase difference indicating the positional shift.

(4)

The signal processing device according to any of (1) to (3) described above, wherein the phase difference calculating unit adopts an arrangement without the positional shift between the plurality of transducers as the reference arrangement.

(5)

The signal processing device according to any of (1) to (4) described above, wherein the phase difference calculating unit adopts the arrangement without the positional shift between the plurality of transducers as the reference arrangement in first calculation of the phase difference indicating the positional shift and adopts the arrangement of the plurality of transducers with the positional shift indicated by the previously calculated phase difference as the reference arrangement in second or subsequent calculation.

(6)

The signal processing device according to any of (1) to (5) described above, wherein the plurality of transducers is one-dimensionally arranged.

(7)

The signal processing device according to any of (1) to (6) described above, wherein the plurality of transducers is two-dimensionally arranged.

(8)

The signal processing device according to any of (1) to (7) described above, wherein the plurality of transducers is divided into a plurality of functional blocks such that a group of a predetermined number of transducers is made a functional block, and the phase difference calculating means calculates the phase difference indicating the positional shift for each unit while making the functional block a unit.

This technology may be applied to an editing device which edits contents.

REFERENCE SIGNS LIST

10 Ultrasonic diagnostic device, 21 Mode controller, 22 Transmission BF unit, 23 Transmission/reception switching unit, 24 Probe, 25 Reception BF unit, 26 Delay calculating unit, 27 Signal processor, 28 Display unit, 31 Transducer, 41 Flexible substrate, 51a, 51b cMUT, 71 Functional block

The invention claimed is:

1. A signal processing device for processing ultrasonic signals received by an ultrasonic probe comprising a plurality of transducers in which relative positions between transducers of the plurality of transducers are not fixed, the signal processing device comprising:
at least one processor; and
at least one storage having encoded thereon executable instructions that, when executed by the at least one processor, cause the at least one processor to carry out a method, the method comprising:
calculating, for each one of the plurality of transducers, a phase difference indicating a relative positional shift of the one transducer relative to one or more others of the plurality of transducers, wherein calculating the phase difference for each one of the plurality of transducers comprises calculating a difference between a reference phase difference for the one transducer and a calibration phase difference for the one transducer, wherein the calibration phase difference is a detected phase difference of a received signal for a reflective ultrasonic wave received in the one transducer after a calibration signal is transmitted from the plurality of transducers, and the reference phase difference is an expected phase difference of a signal received in the one transducer when the plurality of transducers is in a reference arrangement;
calculating a delay amount for each of the plurality of transducers based at least in part on each phase difference calculated for each of the plurality of transducers; and
performing beam forming using the delay amount calculated for at least some of the plurality of transducers.

2. The signal processing device according to claim 1, wherein the method further comprises:
selecting, over time, each one of the plurality of transducers from which to transmit the calibration signal;
in response to each selection, transmitting the calibration signal from the selected one of the plurality of transducers; and
performing the calculating of the phase difference indicating the positional shift for each of the plurality of transducers in response to receipt of the calibration signal, via the plurality of transducers, following each transmission.

3. The signal processing device according to claim 1, wherein the method further comprises:
selecting, over time, two or more of the plurality of transducers from which to transmit the calibration signal;
in response to each selection, transmitting the calibration signal from the selected two or more of the plurality of transducers; and
performing the calculating of the phase difference indicating the positional shift for each of the plurality of transducers in response to each transmission of the calibration signal.

4. The signal processing device according to claim 2, wherein the reference arrangement of the plurality of transducers, to which the reference phase difference relates, is an arrangement without positional shift between the plurality of transducers.

5. The signal processing device according to claim 3, wherein:
the method comprises repeating a number of times the calculating of the phase difference for each of the plurality of transducers;
an initial iteration of the repeating of the calculating comprises calculating the difference between the calibration phase difference and the reference phase difference using, as the reference arrangement, an arrangement of the plurality of transducers without positional shift between the plurality of transducers and
at least one subsequent iteration of the repeating of the calculating comprises calculating the difference between the calibration phase difference and the reference phase difference using, as the reference arrangement, an arrangement of the plurality of transducers having a positional shift indicated by previously-calculated phase differences indicating relative positional shifts between the plurality of transducers determined from one or more prior iterations of the repeating.

6. The signal processing device according to claim 1, wherein
the plurality of transducers is one-dimensionally arranged.

7. The signal processing device according to claim 1, wherein
the plurality of transducers is two-dimensionally arranged.

8. The signal processing device according to claim 1, wherein
the plurality of transducers is divided into a plurality of functional blocks, wherein a first plurality of transducers, of the plurality of transducers, is included in a first functional block of the plurality of functional blocks, and
calculating the phase difference indicating the positional shift for each of the plurality of transducers comprises calculating the phase difference for each of the first plurality of transducers at least in part by treating the first functional block as a single unit.

9. A signal processing method of operating a signal processing device for processing ultrasonic signals received by an ultrasonic probe comprising a plurality of transducers in which relative positions between transducers of the plurality of transducers are not fixed, the method comprising:

calculating, for each one of the plurality of transducers, a phase difference indicating a relative positional shift of the one transducer relative to one or more others of the plurality of transducers, wherein calculating the phase difference for each one of the plurality of transducers comprises calculating a difference between a reference phase difference for the one transducer and a calibration phase difference for the one transducer, wherein the calibration phase difference is a detected phase difference of a received signal for a reflective ultrasonic wave received in the one transducer after a calibration signal is transmitted from the plurality of transducers, and the reference phase difference is an expected phase difference of a signal received in the one transducer when the plurality of transducers is in a reference arrangement;

calculating a delay amount for each of the plurality of transducers based at least in part on each phase difference calculated for each of the plurality of transducers; and performing beam forming using the delay amount calculated for at least some of the plurality of transducers.

10. At least one non-transitory computer-readable storage medium having encoded thereon executable instructions that, when executed by at least one processor, cause the at least one processor to carry out a method, the method comprising:

calculating, for each one of the plurality of transducers, a phase difference indicating a relative positional shift of the one transducer relative to one or more others of the plurality of transducers, wherein calculating the phase difference for each one of the plurality of transducers comprises calculating a difference between a reference phase difference for the one transducer and a calibration phase difference for the one transducer, wherein the calibration phase difference is a detected phase difference of a received signal for a reflective ultrasonic wave received in the one transducer after a calibration signal is transmitted from the plurality of transducers, and the reference phase difference is an expected phase difference of a signal received in the one transducer when the plurality of transducers is in a reference arrangement;

calculating a delay amount for each of the plurality of transducers based at least in part on each phase difference calculated for each of the plurality of transducers; and performing beam forming using the delay amount calculated for at least some of the plurality of transducers.

* * * * *